United States Patent
Mitsugi

(10) Patent No.: US 9,262,817 B2
(45) Date of Patent: Feb. 16, 2016

(54) ENVIRONMENT ESTIMATION APPARATUS AND VEHICLE CONTROL SYSTEM

(75) Inventor: Tatsuya Mitsugi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 318 days.

(21) Appl. No.: 13/812,419

(22) PCT Filed: Nov. 19, 2010

(86) PCT No.: PCT/JP2010/006799
§ 371 (c)(1),
(2), (4) Date: Jan. 25, 2013

(87) PCT Pub. No.: WO2012/066609
PCT Pub. Date: May 24, 2012

(65) Prior Publication Data
US 2013/0116857 A1    May 9, 2013

(51) Int. Cl.
*G06T 7/00*    (2006.01)
*B60Q 1/14*    (2006.01)
*G06T 7/40*    (2006.01)

(52) U.S. Cl.
CPC . *G06T 7/00* (2013.01); *B60Q 1/143* (2013.01); *G06T 7/408* (2013.01); *B60Q 2300/314* (2013.01); *G06T 2207/10016* (2013.01); *G06T 2207/10024* (2013.01); *G06T 2207/20021* (2013.01); *G06T 2207/30252* (2013.01)

(58) Field of Classification Search
CPC . G06T 7/00; G06T 7/408; G06T 2207/30252; G06T 2207/10; G06T 2207/10024; B60Q 1/143; B60Q 2300/314
See application file for complete search history.

(56) References Cited

U.S. PATENT DOCUMENTS

| 2007/0211144 A1* | 9/2007 | Fujita et al. | 348/142 |
| 2008/0024606 A1* | 1/2008 | Kawasaki | 348/148 |
| 2009/0136125 A1* | 5/2009 | Fujita | 382/165 |
| 2009/0323366 A1* | 12/2009 | Furusawa | 362/466 |

FOREIGN PATENT DOCUMENTS

| JP | 9-142259 A | 6/1997 |
| JP | 2006-36048 A | 2/2006 |
| JP | 2007-57331 A | 3/2007 |
| JP | 2007-101307 A | 4/2007 |
| JP | 2007-320487 A | 12/2007 |
| JP | 2009-255722 A | 11/2009 |
| JP | 2010-6172 A | 1/2010 |
| WO | WO 2007/000999 A1 | 1/2007 |

* cited by examiner

*Primary Examiner* — John Q Nguyen
*Assistant Examiner* — Jordan S Fei
(74) *Attorney, Agent, or Firm* — Birch, Stewart, Kolasch & Birch, LLP

(57) ABSTRACT

An environment estimation apparatus includes an image area dividing unit for dividing a camera image taken with a vehicle camera into a plurality of image areas, a camera image information extracting unit for extracting, from an image area that has the sky taken and is acquired from among the plurality of image areas undergoing the division by the image area dividing unit, image information indicating features of the image area, and an environment estimation unit for estimating, from the image information extracted by the camera image information extracting unit, the weather or intensity of light of a surrounding environment by referring to corresponding data indicating the correspondence between the features of the image area and the weather or the intensity of light of the surrounding environment.

2 Claims, 14 Drawing Sheets

FIG.3

| Mean Illuminance | Illuminance State | Vehicle Signal |
|---|---|---|
| | | ILL |
| $E < ILL\_a$ | Low | On |
| $E \geq ILL\_a$ | High | Off |

FIG.7

| Hue | Tone | | Color State | Environment Estimate | Vehicle Signal |
|---|---|---|---|---|---|
| | Saturation | Value | | | ILL (Headlights or Sidelights) |
| 170<H<250 | S>50 | V>30 | Blue | Daytime, Fair | Off |
| | | V≦30 | Black | Nighttime | On |
| | S≦50 | V>30 | Gray | Daytime, Cloudy | On |
| | | V≦30 | Black | Nighttime | On |
| H≦170 or H≧250 | S>50 | V>30 | Orange | Evening, Fair | On |
| | | V≦30 | Black | Nighttime | On |
| | S≦50 | V>30 | Red Gray | Evening, Cloudy | On |
| | | V≦30 | Black | Nighttime | On |

FIG.9

| Illuminance Relationships (E1, E2, E3) | Environment Estimate | Vehicle Signal | | |
|---|---|---|---|---|
| | | ILL (Headlights or Sidelights) | Wipers | Fog |
| Upper > Central > Lower | Daytime, Clear | Off | Off | Off |
| Upper > Central ≒ Lower | Daytime, Fair | Off | Off | Off |
| Upper > Lower > Central | Daytime, Fair | Off | Off | Off |
| Upper ≒ Central > Lower | Daytime, Cloudy | Off | Off | Off |
| Upper ≒ Lower > Central | Foggy | Turn On Sidelights Only | Off | On |
| Upper ≒ Central ≒ Lower | Foggy | Turn On Sidelights Only | Off | On |
| Central > Upper > Lower | Nighttime | On | Off | Off |
| Central > Upper ≒ Lower | Nighttime | On | Off | Off |
| Central > Lower > Upper | Nighttime | On | Off | Off |
| Central ≒ Lower > Upper | Nighttime, Rainy | On | On | Off |
| Lower > Upper > Central | Rainy | Turn On Sidelights Only | On | Off |
| Lower > Upper ≒ Central | Rainy | Turn On Sidelights Only | On | Off |
| Lower > Central > Upper | Rainy | Turn On Sidelights Only | On | Off |

FIG.11
(a)
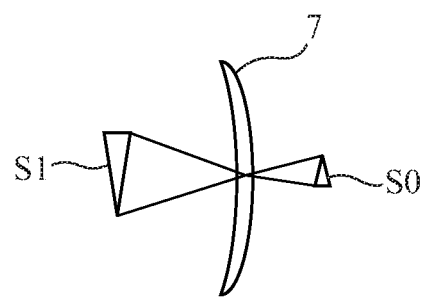
(b)
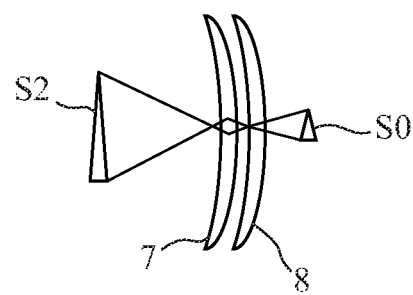

US 9,262,817 B2

ENVIRONMENT ESTIMATION APPARATUS AND VEHICLE CONTROL SYSTEM

TECHNICAL FIELD

The present invention relates to an environment estimation apparatus for estimating the surrounding environment of a vehicle or the like from a camera image taken with a camera installed in the vehicle or the like, and a vehicle control system using the device.

BACKGROUND ART

A vehicle camera fixed on a vehicle is used for detecting an obstacle outside the car from a camera image and for parking support. In addition, it is possible from an image of the vehicle camera to acquire illuminance information indicating the brightness in the imaging range, and to decide the intensity of light at the site of the vehicle from the illuminance of the entire screen determined by the illuminance information. Using the decision result enables automatic turning on and off of the lights.

For example, a Patent Document 1 discloses an auto-light device comprising an imaging device for taking an image ahead of the vehicle, and a light control device for executing light control of turning on or off the lights in accordance with the image taken with the imaging device. The apparatus selects to turn off the lights when the brightness (cd/m$^2$) in front of the vehicle is not less than a preset level 1 (first reference value), and to turn on the sidelights when the brightness is greater than a preset level 2 (second reference value) but is less than the level 1. When the brightness is less than the level 2, it selects to turn on the headlights.

PRIOR ART DOCUMENT

Patent Document

Patent Document 1: Japanese Patent Laid-Open No. 2010-6172.

DISCLOSURE OF THE INVENTION

The conventional technique typified by the Patent Document 1 sets an area for deciding the brightness in the camera image in accordance with a running state of the vehicle or environmental conditions around the vehicle. Accordingly, it requires sensors for detecting vehicle information such as the speed and steering angle of the vehicle as the running state of the vehicle. In addition it must specify environmental conditions around the vehicle by recognizing the presence or absence of a preceding vehicle and the driving lane from the camera image.

Thus the conventional technique requires the sensors for detecting the vehicle information and a specific image recognition processing chip, thereby offering a problem of complicating its configuration and of increasing the number of components.

The present invention is implemented to solve the foregoing problems. Therefore it is an object of the present invention to provide an environment estimation apparatus capable of estimating a surrounding environment, which is a subject to be taken with a camera image, by a simple configuration. In addition, another object of the present invention is to provide a vehicle control system for controlling the operation of onboard equipment in accordance with the surrounding environment estimated by the environment estimation apparatus.

Means for Solving Problems

An environment estimation apparatus in accordance with the present invention comprises: an image area dividing unit for dividing a shot image taken with an imaging unit into a plurality of image areas; an information extracting unit for extracting, from an image area that has the sky taken and is acquired from among the plurality of image areas undergoing the division by the image area dividing unit, image information indicating features of the image area; and an environment estimation unit for estimating, from the image information extracted by the information extracting unit, weather or intensity of light of a surrounding environment by referring to corresponding data indicating correspondence between the features of the image area and the weather or the intensity of light of the surrounding environment, wherein the information extracting unit always extracts color information on saturation and value of the image area that has the sky taken; and the environment estimation unit estimates, from the color information extracted by the information extracting unit, the weather and the intensity of light of the surrounding environment by referring to the corresponding data indicating the correspondence between the color information about the image area and the weather and the intensity of light of the surrounding environment.

Advantages of the Present Invention

According to the present invention, it offers an advantage of being able to estimate the surrounding environment of the subject from the camera image by a simple configuration.

BRIEF DESCRIPTION OF THE DRAWINGS

FIG. 3 is a table showing correspondence of the mean illuminance of an image area to the illuminance state of the surrounding environment and to the content of the vehicle signal to vehicle lights;

FIG. 7 is a table showing an example of the correspondence of the hue, tone and color state of an image area to a surrounding environment and the content of a vehicle signal to vehicle lights;

FIG. 9 is a table showing an example of the correspondence of the mean illuminance of each rectangular image area to a surrounding environment and the content of the vehicle signal;

FIG. 11 is a diagram illustrating alteration of a subject on a plane of projection due to raindrops or rain film;

BEST MODE FOR CARRYING OUT THE INVENTION

The best mode for carrying out the invention will now be described with reference to the accompanying drawings to explain the present invention in more detail.

Embodiment 1

Figure 1:
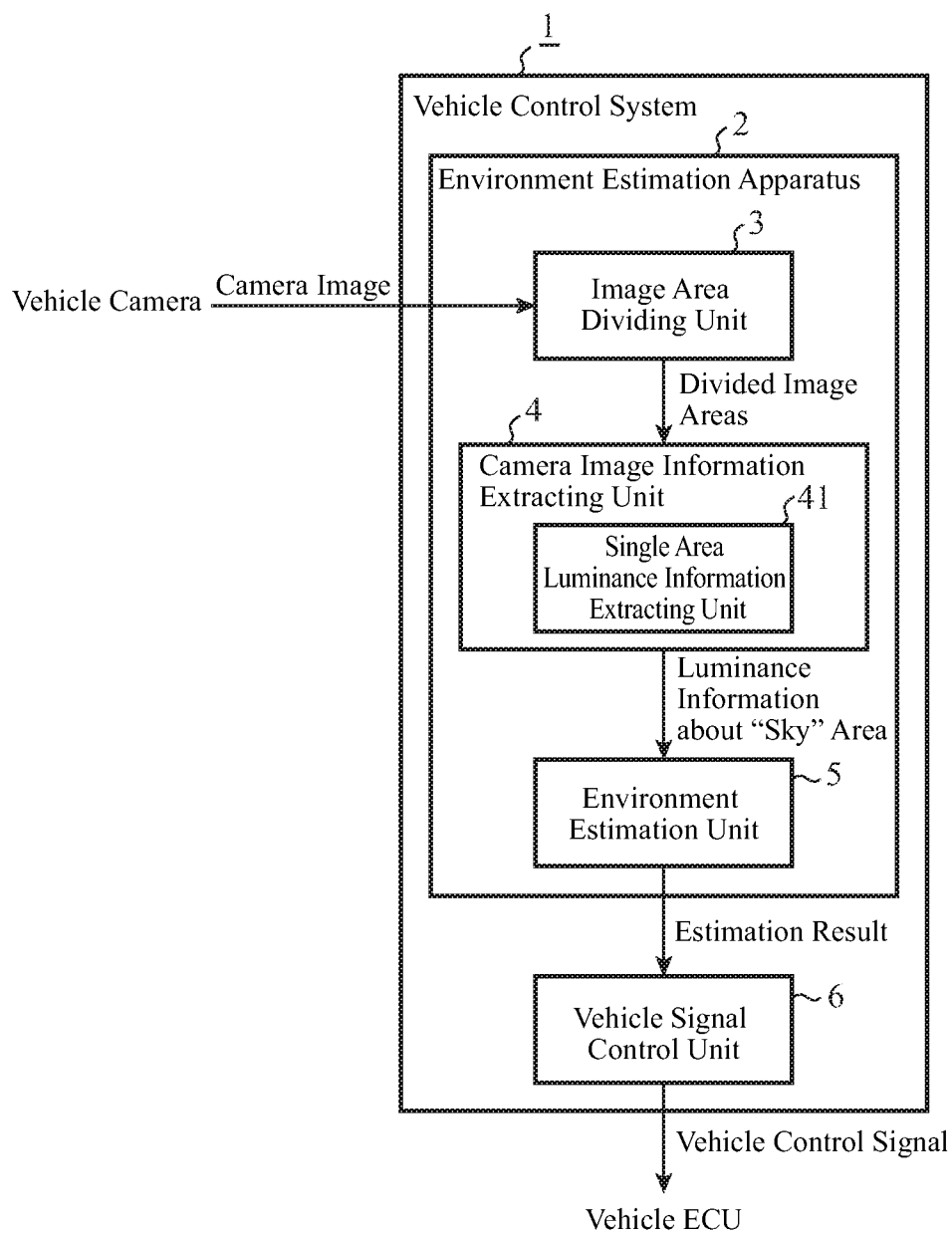
FIG. 1 is a block diagram showing a configuration of a vehicle control system using an environment estimation apparatus of an embodiment 1 in accordance with the present invention.

FIG. 1 is a block diagram showing a configuration of a vehicle control system using the environment estimation apparatus of an embodiment 1 in accordance with the present invention. In FIG. 1, the vehicle control system 1 of the embodiment 1, which is a control system for controlling the operation of onboard equipment, comprises an environment estimation apparatus 2 and a vehicle signal control unit 6. In addition, the environment estimation apparatus 2, which is a device for estimating a surrounding environment of the vehicle from a camera image (shot image) taken with a vehicle camera (imaging unit), comprises an image area dividing unit 3, a camera image information extracting unit (information extracting unit) 4 and an environment estimation unit 5. Incidentally, the vehicle camera is a camera fixed on the vehicle in such a manner as to enable its imaging range to include as a subject a part of a view with a particular attribute (such as the sky) among views outside the vehicle.

The image area dividing unit 3 is a component for dividing a camera image taken with the vehicle camera into prescribed image areas. For example, an X axis is assigned to the horizontal direction (right and left direction) of a screen that displays the camera image and a Y axis is assigned to the vertical direction (up and down direction) thereof, and a plurality of rectangular image areas are defined by making divisions with a prescribed size in the XY axis directions. Incidentally, it is assumed in the present embodiment 1 that at least one of the rectangular image areas, into which the camera image is divided, includes the sky in the imaging range. In other words, as for the vehicle camera in accordance with the present invention, a camera that has a prescribed vertical angle of view is fixed so as to include the sky as its subject by adjusting the setting height of the camera, its horizontal setting angle, vertical setting angle and the shift from the midline of the vehicle.

The camera image information extracting unit 4, which is a component for extracting camera image information from the image areas that undergo the division by the image area dividing unit 3, comprises a single area luminance information extracting unit 41. The term "camera image information" mentioned in the present invention contains shape information, luminance information and color information about a subject of the camera image. The single area luminance information extracting unit 41 is a component for extracting as luminance information the mean illuminance that is obtained by averaging the illuminance of pixels in image areas containing the sky as the subject from among the plurality of image areas provided by the image area dividing unit 3.

The environment estimation unit 5 is a component for estimating the surrounding environment of the vehicle from the camera image information extracted by the camera image information extracting unit 4. In the embodiment 1, the environment estimation unit 5 estimates as to whether the surrounding environment at the spot of the vehicle is light or dark from a result of comparison of the mean illuminance of the image areas including the sky as the subject, which is extracted by the single area luminance information extracting unit 41, with the prescribed threshold about the illuminance of the image.

The vehicle signal control unit 6 is a component for controlling the operation of the onboard equipment of the vehicle in accordance with the estimation result of the surrounding environment by the environment estimation unit 5. In accordance with the estimation result by the environment estimation unit as to whether the surrounding environment of the vehicle is light or dark, the embodiment 1 generates a vehicle control signal for operating the onboard equipment in such a manner as to make the vehicle state adaptive to the surrounding environment. For example, when estimating that the surrounding environment of the vehicle is dark, it supplies a vehicle ECU (Electric Control Unit) with the vehicle control signal for turning on the vehicle lights. Receiving the vehicle control signal, the vehicle ECU operates the onboard equipment corresponding to the vehicle control signal.

Incidentally, although FIG. 1 shows a configuration that comprises the vehicle control system 1 of the embodiment 1 separately from the vehicle ECU, a configuration is also possible which includes the system 1 as a functional component of the vehicle ECU.

In addition, as for the image area dividing unit 3, camera image information extracting unit 4, environment estimation unit 5 and vehicle signal control unit 6, they are implemented as a concrete device incorporating software and hardware by causing a computer constituting the vehicle control system 1 or vehicle ECU to execute environment estimation and vehicle control programs in conformity with the purpose of the present invention.

Figure 2:
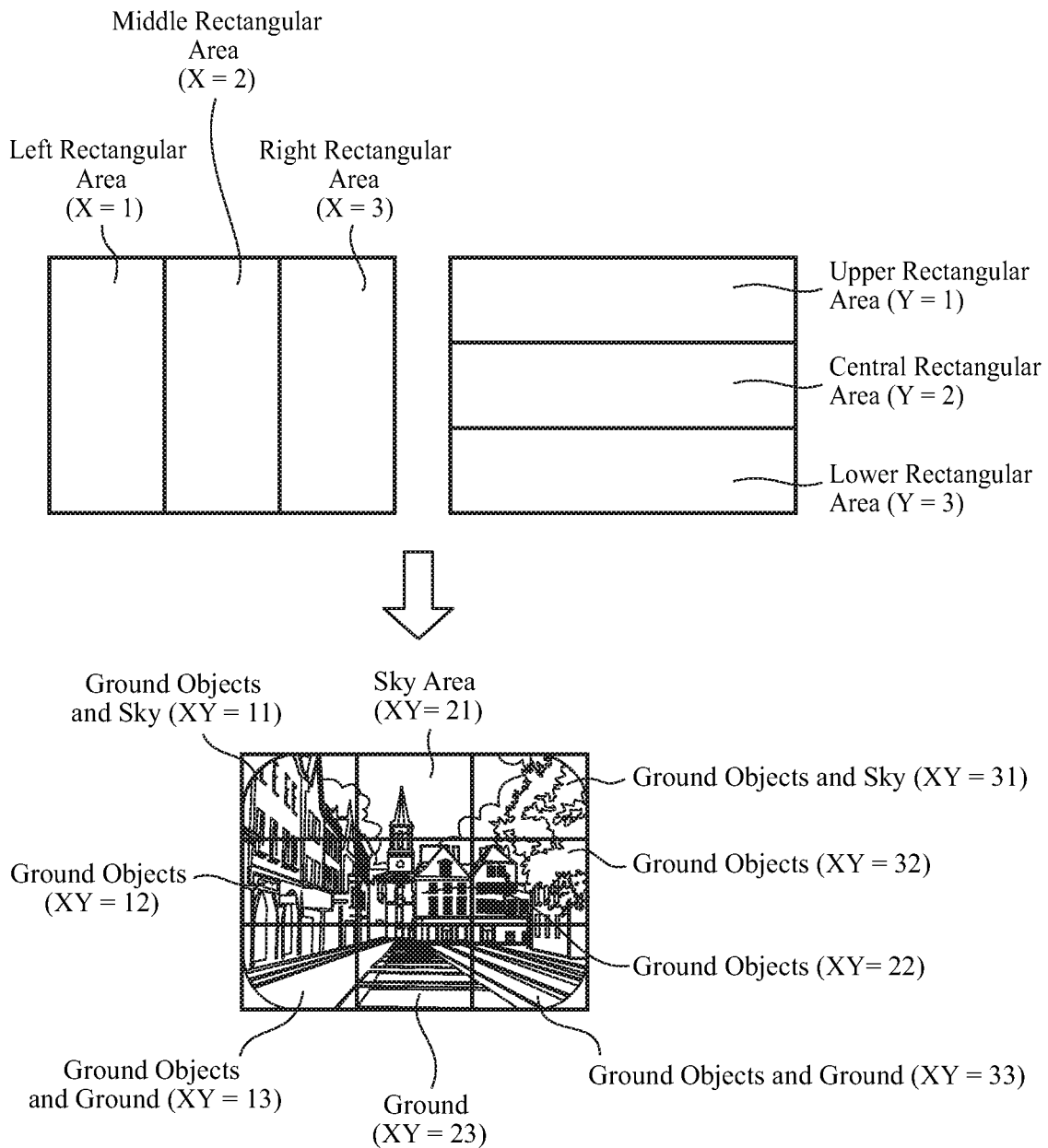
FIG. 2 is a diagram showing an example of dividing processing of a camera image in the embodiment 1.

FIG. 2 is a diagram showing an example of the dividing processing of a camera image of the embodiment 1. The camera image shown in FIG. 2 is an image taken with a front camera which has the horizontal angle of view of 180 degrees and the vertical angle of view of 150 degrees, and is fixed on the midline of the vehicle at the setting height of 200 mm, the horizontal setting angle of 0 degree and the vertical setting angle of 30 degrees so that the front direction of the vehicle comes into the imaging range. In the example of FIG. 2, the image area dividing unit 3 assigns the X axis to the horizontal direction (right and left direction) of the screen showing the camera image and the Y axis to the vertical direction (up and down direction) thereof, and divides the image into three sections with prescribed sizes in the XY axis directions, thereby defining image areas (XY=11-33). More specifically, it divides the X axis direction of the camera image into three parts of the left rectangular area (X=1), middle rectangular area (X=2), and right rectangular area (X=3), and divides the Y axis direction into three parts of the upper rectangular area (Y=1), central rectangular area (Y=2), and lower rectangular area (Y=3), thereby dividing the image into nine image areas as a whole.

Here, FIG. 2 shows a camera image when the vehicle is moving in a city. The subject of the vehicle camera contains "ground objects" such as urban buildings and structures and trees, "the sky" that is a natural view, and "the ground" showing the driving road. The main subjects in each image area are as follows: the area (XY=11) has "ground objects and the sky" since part of the buildings and the sky appear therein; the area (XY=21) has "the sky" and the area (XY=31) has "ground objects and the sky" since trees and the sky appear therein; the area (XY=12) has "ground objects", the area (XY=22) has "ground objects" as well, and the area (XY=32) has "ground objects"; and the area (XY=13) has "ground objects and the ground", the area (XY=23) has "the ground", and the area (XY=33) has "ground objects and the ground".

In addition, when the vehicle travels in a mountainous region, a subject of the vehicle camera contains a "mountain" and "the sky" which are a natural view, and "the ground" showing the driving road. For example, when the vehicle travels along a mountain path and a mountain is seen remotely in the direction of traveling of the vehicle, the main subjects in each image area are as follows: the area (XY=11) has the "mountain and the sky", the area (XY=21) has "the sky", and the area (XY=31) has the "mountain and the sky"; the area (XY=12) has the "mountain", the area (XY=22) has the "mountain and the sky", and the area (XY=32) has the "mountain and the sky"; and the area (XY=13) has "the ground", the area (XY=23) has "the ground", and the area (XY=33) has "the ground".

Furthermore, a subject of the vehicle camera when the vehicle travels in a plain other than cities (such as a grassy plain without any building) contains a "plain" such as a grassy plain and "the sky" which are a natural view, and "the ground" indicating the driving road. For example, when the vehicle travels along a road passing through a plain, the main subjects in each image area are as follows: the area (XY=11) has "the sky", the area (XY=21) has "the sky", and the area (XY=31) has "the sky"; the area (XY=12) has the "plain", the area (XY=22) has the "plain and the sky", and the area (XY=32) has the "plain"; and the area (XY=13) has "the ground", the area (XY=23) has "the ground", and the area (XY=33) has "the ground".

Thus, the chances that the image contains the sky as a subject will increase by setting the vehicle camera in such a manner that it has a field of view that will enable it to look out across a surrounding view of the vehicle in a prescribed direction from a distance without turning the imaging direction toward the ground excessively and by repeating to take an image continuously or periodically while the vehicle is traveling outside. For example, in FIG. 2, it is likely that the upper rectangular area (Y=1) that will take a view above the vehicle includes the sky as a subject. Incidentally, an ordinary vehicle camera is set in such a manner as to have a field of view that enables looking out over a front, rear or side view of the vehicle from a distance.

Thus, the embodiment 1 defines at least one of the image areas (XY=11, 21, 31) in the upper rectangular area (Y=1) as an image area that contains the sky as a subject.

FIG. 3 is a table showing correspondence of the mean illuminance of an image area with the illuminance state of the surrounding environment and the content of the vehicle signal to the vehicle lights. In FIG. 3, a threshold ILL_a is the lowest limit of the mean illuminance indicating the brightness that allows turning off the vehicle lights, and is set in the environment estimation unit 5. In addition, the environment estimation unit 5 stores data showing the correspondence between the mean illuminance and the illuminance state shown in FIG. 3. Furthermore, as for the data showing the correspondence between the illuminance state and the content of the vehicle signal shown in FIG. 3, it is set in the vehicle signal control unit 6. When the illuminance state is "low", that is, when the surroundings of the vehicle are dark, the vehicle signal ILL instructing to turn on the vehicle lights is made on. In contrast, when the illuminance state is "high", that is, when the surroundings of the vehicle are light, the vehicle signal ILL instructing to turn on the vehicle lights is made off.

Next, the operation will be described.

Figure 4:
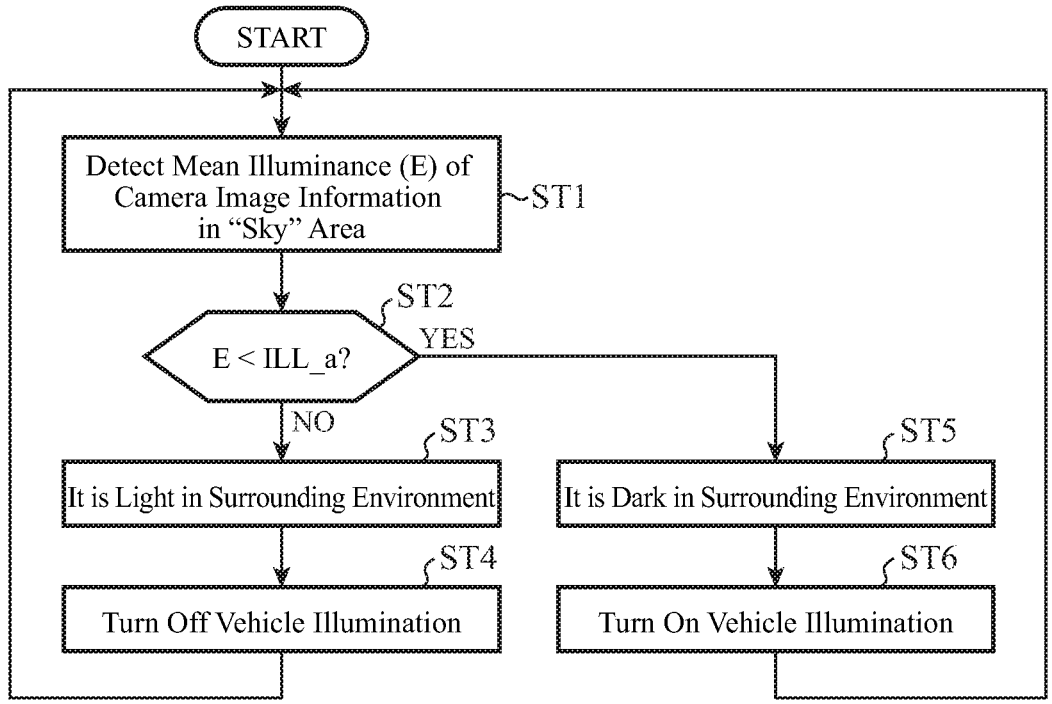
FIG. 4 is a flowchart showing a flow of environment estimation and vehicle control of the embodiment 1.

FIG. 4 is a flowchart showing a flow of the environment estimation and vehicle control in the embodiment 1. Referring to FIG. 4, the environment estimation processing and the vehicle control processing will be described in detail. Incidentally, as for the configuration of the system, we will refer to FIG. 1.

First, the single area luminance information extracting unit 41 of the camera image information extracting unit 4 detects the mean illuminance E, which is obtained by averaging the illuminance of the pixels in the image area, from the image area ("the sky" area) which includes the sky as a subject among the plurality of image areas acquired from the image area dividing unit 3 (step ST1). Here, in the camera image of the vehicle camera, part of the image areas corresponding to the upper rectangular area (Y=1) of FIG. 2 is identified as the image area which includes the sky as a subject. In the following, it is assumed that the single area luminance information extracting unit 41 identifies, in the upper rectangular area (Y=1), the area (XY=21) that has the sky as its main subject as the image area which includes the sky as a subject, and detects the mean illuminance E of that area.

Receiving the mean illuminance E of the image area (area (XY=21)) which includes the sky as a subject from the single area luminance information extracting unit 41, the environment estimation unit 5 decides as to whether the mean illuminance E is less than a prescribed threshold ILL_a or not (step ST2). If the mean illuminance E is not less than the prescribed threshold ILL_a (NO at step ST2), the environment estimation unit 5 estimates from the comparison decision result that the surrounding environment (the sky) of the vehicle is light by referring to the data indicating the correspondence between the mean illuminance and the illuminance state shown in FIG. 3, and supplies the estimation result to the vehicle signal control unit 6 (step ST3).

Receiving the estimation result of the illuminance state (high) indicating that the surrounding environment (the sky) of the vehicle is light, the vehicle signal control unit 6 supplies the vehicle ECU with the vehicle signal for turning off the vehicle lights by referring to the data indicating the correspondence between the illuminance state and the content of the vehicle signal shown in FIG. 3 in accordance with the estimation result. Thus, the vehicle ECU turns off the vehicle illumination in response to the vehicle signal from the vehicle signal control unit 6 (step ST4).

On the other hand, if the mean illuminance E is less than the prescribed threshold ILL_a (YES at step ST2), the environment estimation unit 5 estimates from the comparison decision result that the surrounding environment (the sky) of the vehicle is dark by referring to the data indicating the correspondence between the mean illuminance and the illuminance state shown in FIG. 3, and supplies the estimation result to the vehicle signal control unit 6 (step ST5).

Receiving the estimation result of the illuminance state (low) indicating that the surrounding environment (the sky) of the vehicle is dark, the vehicle signal control unit 6 supplies the vehicle ECU with the vehicle signal for turning on the vehicle lights by referring to the data indicating the correspondence between the illuminance state and the content of the vehicle signal shown in FIG. 3 in accordance with the estimation result. The vehicle ECU turns on the vehicle illumination in response to the vehicle signal from the vehicle signal control unit 6 (step ST6).

When the processing at step ST4 or step ST6 terminates, the processing returns to step ST1 to repeat the foregoing processing so as to monitor the change of the intensity of light of the sky and to control the onboard equipment (vehicle lights) in accordance with the change.

Incidentally, in the environment estimation processing at step ST2, it is also possible to set the threshold ILL_a for the mean illuminance E as a first threshold, and to set a threshold ILL_b which is smaller than the threshold ILL_a as a second threshold, and to estimate the intensity of light in more detail using the illuminance range defined by the first and second thresholds.

For example, If the mean illuminance E is not less than the threshold ILL_a, an estimate is made that the surrounding environment (the sky) of the vehicle is light and all the lights of the vehicle are turned off. If the mean illuminance E is less than the threshold ILL_b, an estimate is made that the surrounding environment (the sky) of the vehicle is dark, and the headlights are turned on among the vehicle lights. In addition, if the mean illuminance E is less than the threshold ILL_a and is not less than the threshold ILL_b, an estimate is made that the surrounding environment (the sky) of the vehicle is rather light and the sidelights are turned on among the vehicle lights.

As described above, according to the present embodiment 1, it comprises the image area dividing unit 3 for dividing a camera image taken with the vehicle camera into a plurality of image areas; the camera image information extracting unit 4 for extracting, from an image area that has the sky taken, the image information indicating features of the image area among the plurality of image areas that undergo the division by the image area dividing unit 3; and the environment estimation unit 5 for estimating the weather or the intensity of light in the surrounding environment by referring to the corresponding data indicating the correspondence between the features of the image area and the weather or the intensity of light in the surrounding environment in accordance with the image information extracted by the camera image information extracting unit 4.

In particular, the camera image information extracting unit 4 extracts, from the image area that has the sky taken, its luminance information, and the environment estimation unit 5 estimates the intensity of light in the surrounding environment by referring to the corresponding data indicating the correspondence between the luminance information about the image area and the intensity of light in the surrounding environment in accordance with the luminance information extracted by the camera image information extracting unit 4.

In this way, since the image area that includes the sky as a subject can be identified as the image area at a fixed position among the plurality of image areas acquired by dividing the camera image of the vehicle camera fixedly installed in the vehicle, using the mean illuminance E of the image area makes it possible to estimate the intensity of light in the surrounding environment of the vehicle. This can obviate the necessity of a dedicated illuminance sensor or an image recognition chip, and can estimate the surrounding environment of the vehicle by a simple configuration.

Embodiment 2

Figure 5:
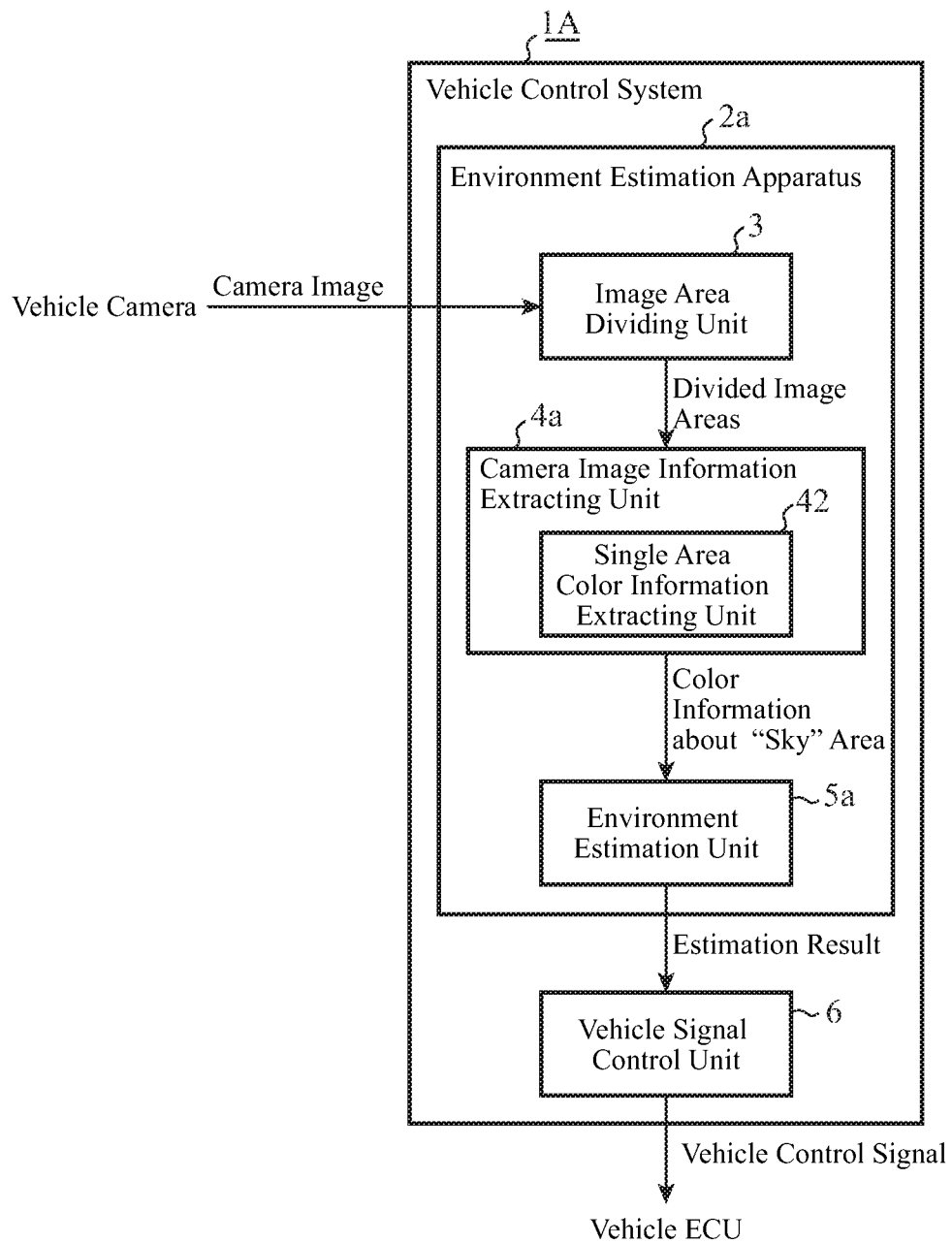
FIG. 5 is a block diagram showing a configuration of a vehicle control system using an environment estimation apparatus of an embodiment 2 in accordance with the present invention.

FIG. 5 is a block diagram showing a configuration of a vehicle control system using the environment estimation apparatus of an embodiment 2 in accordance with the present invention. In FIG. 5, the vehicle control system 1A of the embodiment 2, which is a control system for controlling the operation of the onboard equipment, comprises an environment estimation apparatus 2a and the vehicle signal control unit 6. In addition, the environment estimation apparatus 2a, which is a device for estimating the surrounding environment of the vehicle from a camera image taken with the vehicle camera, comprises the image area dividing unit 3, a camera image information extracting unit 4a and an environment estimation unit 5a. Incidentally, in FIG. 5, the same components as those of FIG. 1 are designated by the same reference numerals and their description will be omitted.

The camera image information extracting unit 4a, which is a component for extracting camera image information from image areas undergoing the division by the image area dividing unit 3, has a single area color information extracting unit 42. The single area color information extracting unit 42 is a component for extracting, as color information from the image area that includes the sky as a subject among the plurality of image areas obtained by the image area dividing unit 3, the mean hue H obtained by averaging the hues of the pixels in the image area, the mean saturation S obtained by averaging the saturation of the pixels and the mean value V obtained by averaging the values of the pixels.

The environment estimation unit 5a is a component for estimating the surrounding environment of the vehicle from the camera image information extracted by the camera image information extracting unit 4a. In the embodiment 2, the environment estimation unit 5a estimates the surrounding environment at the spot of the vehicle from comparison results of the mean hue H, mean saturation S, and mean value V in the image area, which includes the sky as a subject extracted by the single area color information extracting unit 42, with prescribed thresholds concerning them.

Next, the operation will be described.

Figure 6:
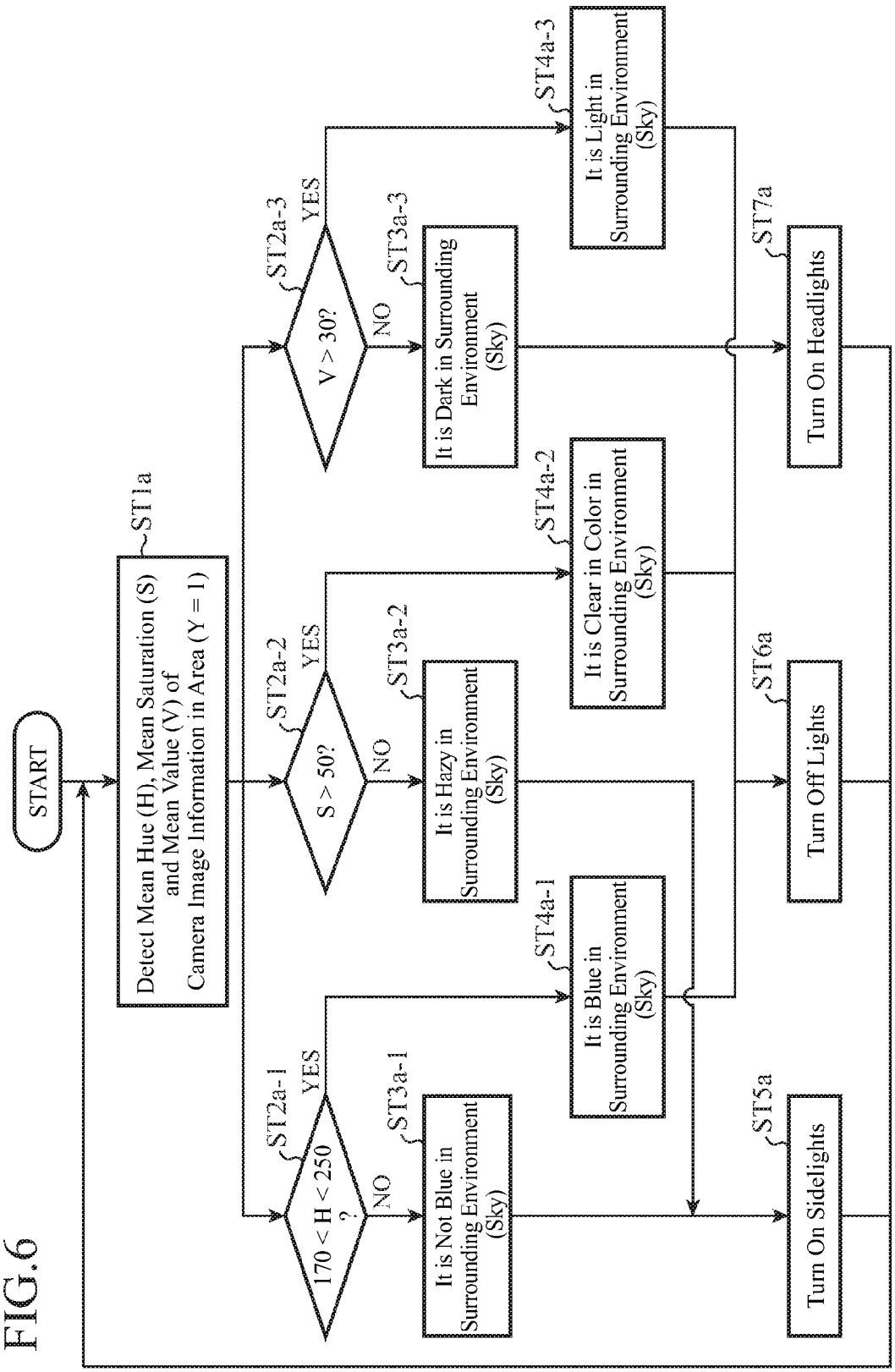
FIG. 6 is a flowchart showing a flow of the environment estimation and vehicle control of the embodiment 2.

FIG. 6 is a flowchart showing a flow of the environment estimation and vehicle control in the embodiment 2. Referring to FIG. 6, the environment estimation processing and the vehicle control processing will be described in detail. Incidentally, as for the configuration of the system, we will refer to FIG. 5.

First, the single area color information extracting unit 42 of the camera image information extracting unit 4a detects, from the image area that includes the sky as a subject among the plurality of image areas obtained by the image area dividing unit 3, the mean hue H obtained by averaging the hues of the pixels in the image area, the mean saturation S obtained by averaging the saturation of the pixels and the mean value V obtained by averaging the values of the pixels (step ST1a). Here, among the camera images of the vehicle camera, the upper rectangular area (Y=1) of FIG. 2 shown in the foregoing embodiment 1 is identified as the image area that includes the sky as a subject.

Receiving the mean hue H, mean saturation S and mean value V of the image area that includes the sky as a subject from the single area color information extracting unit 42, the environment estimation unit 5a decides as to whether the mean hue H is in a prescribed hue range H_a (hue range greater than 170 degrees and less than 250 degrees) or not (step ST2a-1). In addition, the environment estimation unit 5a decides on whether the mean saturation S is greater than a prescribed saturation threshold S_a (50 in the example of FIG. 6) or not (step ST2a-2). Furthermore, the environment estimation unit 5a decides on whether the mean value V is greater than a prescribed value threshold V_a (30 in the example of FIG. 6) or not (step ST2a-3).

Unless the mean hue H is in the prescribed hue range H_a (NO at step ST2a-1), the environment estimation unit 5a estimates that the surrounding environment (the sky) of the vehicle is not blue by referring to the data indicating the correspondence between the preset mean hue and the color state in accordance with the comparison decision result, and supplies the estimation result to the vehicle signal control unit 6 (step ST3a-1).

In addition, unless the mean saturation S is greater than the prescribed saturation threshold S_a (NO at step ST2a-2), the environment estimation unit 5a estimates that the surrounding environment (the sky) of the vehicle is hazy by referring to the data indicating the correspondence between the preset mean saturation and the color state in accordance with the comparison decision result, and supplies the estimation result to the vehicle signal control unit 6 (step ST3a-2).

Furthermore, unless the mean value V is greater than the prescribed value threshold V_a (NO at step ST2a-3), the environment estimation unit 5a estimates that the surrounding environment (the sky) of the vehicle is dark by referring to the data indicating the correspondence between the preset mean value and the color state in accordance with the comparison decision result, and supplies the estimation result to the vehicle signal control unit 6 (step ST3a-3).

On the other hand, if the mean hue H is in the prescribed hue range H_a (YES at step ST2a-1), the environment estimation unit 5a estimates that the surrounding environment (the sky) of the vehicle is blue by referring to the data indicating the correspondence between the preset mean hue and the color state in accordance with the comparison decision result, and supplies the estimation result to the vehicle signal control unit 6 (step ST4a-1).

In addition, if the mean saturation S is greater than the prescribed saturation threshold S_a (YES at step ST2a-2), the environment estimation unit 5a estimates that the color of the surrounding environment (the sky) of the vehicle is clear by referring to the data indicating the correspondence between the preset mean saturation and the color state in accordance with the comparison decision result, and supplies the estimation result to the vehicle signal control unit 6 (step ST4a-2).

Furthermore, if the mean value V is greater than the prescribed value threshold V_a (YES at step ST2a-3), the environment estimation unit 5a estimates that the surrounding environment (the sky) of the vehicle is light by referring to the data indicating the correspondence between the preset mean value and the color state in accordance with the comparison decision result, and supplies the estimation result to the vehicle signal control unit 6 (step ST4a-3).

Receiving the estimation result that the surrounding environment (the sky) of the vehicle is not blue (step ST3a-1), or is hazy (step ST3a-2), the vehicle signal control unit 6 supplies the vehicle ECU with the vehicle signal for turning on the sidelights by referring to the data indicating the correspondence between the preset color state and the content of the vehicle signal in accordance with the estimation result. Thus, the vehicle ECU turns on the sidelights in response to the vehicle signal from the vehicle signal control unit 6 (step ST5a).

In addition, receiving the estimation result that the surrounding environment (the sky) of the vehicle is blue (step ST4a-1), or has a clear color (step ST4a-2) and is light (step ST4a-3), the vehicle signal control unit 6 supplies the vehicle ECU with the vehicle signal for turning off the vehicle lights by referring to the data indicating the correspondence between the preset color state and the content of the vehicle signal in accordance with the estimation result. The vehicle ECU turns off the vehicle lights in response to the vehicle signal from the vehicle signal control unit 6 (step ST6a).

Furthermore, receiving the estimation result that the surrounding environment (the sky) of the vehicle is dark (step ST3a-3), the vehicle signal control unit 6 supplies the vehicle ECU with the vehicle signal for turning on the headlights by referring to the data indicating the correspondence between the preset color state and the content of the vehicle signal in accordance with the estimation result. The vehicle ECU turns on the headlights in response to the vehicle signal from the vehicle signal control unit 6 (step ST7a).

After completing the processing at step ST5a, step ST6a or step ST7a, the processing returns to step ST1a and repeats the foregoing processing to monitor the change of the surrounding environment of the vehicle to control the onboard equipment (vehicle lights) in accordance with the change.

Incidentally, in the environment estimation processing at steps ST2a-1-2a-3, it is also possible to set a decision range by combining the thresholds of the mean hue H, mean saturation S and mean value V, and to estimate the state in the surrounding environment in more detail.

FIG. 7 is a table showing an example of the correspondence of the hue, tone and color state of the image area to the surrounding environment and the content of the vehicle signal to the vehicle lights. In the example of FIG. 7, when the mean hue H of the image area that includes the sky as a subject (upper rectangular area (Y=1)) is in the prescribed hue range H_a, and the mean saturation S thereof is greater than the prescribed saturation threshold S_a, and the mean value V thereof is greater than the prescribed value threshold V_a, the environment estimation unit 5a decides that the surrounding environment (the sky) of the vehicle is blue, estimates that it is daytime and sunny in the surrounding environment of the vehicle, and turns off the vehicle lights.

When the mean hue H of the image area that includes the sky as a subject is in the prescribed hue range H_a and the mean saturation S thereof is greater than the prescribed saturation threshold S_a, but the mean value V thereof is not greater than the prescribed value threshold V_a, the environment estimation unit 5a decides that the surrounding environment (the sky) of the vehicle is black, estimates that it is nighttime in the surrounding environment of the vehicle, and turns on the vehicle lights (headlights).

In addition, when the mean hue H of the image area that includes the sky as a subject is in the prescribed hue range H_a, but the mean saturation S thereof is not greater than the prescribed saturation threshold S_a, and the mean value V thereof is greater than the prescribed value threshold V_a, the environment estimation unit 5a decides that the surrounding environment (the sky) of the vehicle is gray, estimates that it is daytime and cloudy in the surrounding environment of the vehicle, and turns on the vehicle lights (sidelights).

Furthermore, when the mean hue H of the image area that includes the sky as a subject is in the prescribed hue range H_a, but the mean saturation S thereof is not greater than the prescribed saturation threshold S_a, and the mean value V is not greater than the prescribed value threshold V_a, the environment estimation unit 5a decides that the surrounding environment (the sky) of the vehicle is black, estimates that it is nighttime in the surrounding environment of the vehicle, and turns on the vehicle lights (headlight).

When the mean hue H of the image area that includes the sky as a subject is not in the prescribed hue range H_a, the mean saturation S thereof is greater than the prescribed saturation threshold S_a, and the mean value V thereof is greater than the prescribed value threshold V_a, the environment estimation unit 5a decides that the surrounding environment (the sky) of the vehicle is orange, estimates that it is evening and sunny (fine) in the surrounding environment of the vehicle, and turns on the vehicle lights (sidelights or headlights).

When the mean hue H of the image area that includes the sky as a subject is not in the prescribed hue range H_a, and the mean saturation S thereof is greater than the prescribed saturation threshold S_a, but the mean value V thereof is not greater than the prescribed value threshold V_a, the environment estimation unit 5a decides that the surrounding environment (the sky) of the vehicle is black, estimates that it is nighttime in the surrounding environment of the vehicle, and turns on the vehicle lights (headlights).

In addition, when the mean hue H of the image area that includes the sky as a subject is not in the prescribed hue range H_a, and the mean saturation S thereof is not greater than the prescribed saturation threshold S_a, but the mean value V thereof is greater than the prescribed value threshold V_a, the environment estimation unit 5a decides that the surrounding environment (the sky) of the vehicle is red gray, estimates that it is evening and cloudy in the surrounding environment of the vehicle, and turns on the vehicle lights (sidelights or headlights).

Furthermore, when the mean hue H of the image area that includes the sky as a subject is not in the prescribed hue range H_a, and the mean saturation S thereof is not greater than the prescribed saturation threshold S_a, and the mean value V thereof is not greater than the prescribed value threshold V_a, the environment estimation unit 5a decides that the surrounding environment (the sky) of the vehicle is black, estimates that it is nighttime in the surrounding environment of the vehicle, and turns on the vehicle lights (headlights).

As described above, according to the present embodiment 2, the camera image information extracting unit 4a extracts the color information about the image area that has the sky taken; and the environment estimation unit 5a estimates the weather and the intensity of light of the surrounding environment by referring to the corresponding data indicating the correspondence between the color information about the image area and the weather and the intensity of light of the surrounding environment in accordance with the color information extracted by the camera image information extracting unit 4a. Thus, since it can identify the image area that includes the sky as a subject as the image area at a fixed position among the plurality of image areas obtained by dividing the camera image taken with the vehicle camera fixedly installed in the vehicle, it can estimate the surrounding environment of the vehicle using the mean hue H, mean saturation S and mean value V of the image area, thereby being able to eliminate the necessity for a dedicated sensor or an image recognition chip, and to estimate the surrounding environment of the vehicle by the simple configuration.

Embodiment 3

Figure 8:
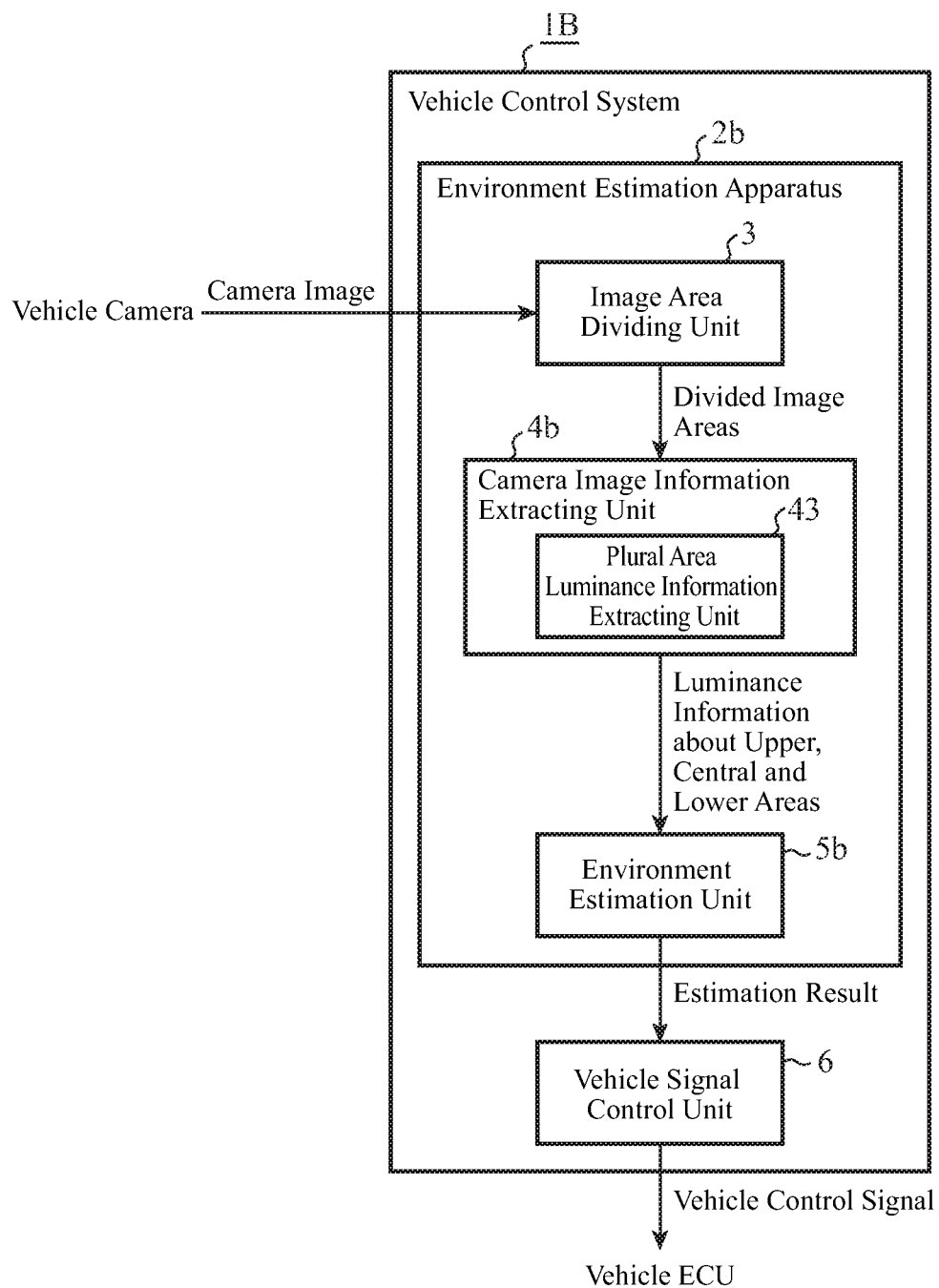
FIG. 8 is a block diagram showing a configuration of a vehicle control system using an environment estimation apparatus of an embodiment 3 in accordance with the present invention.

FIG. 8 is a block diagram showing a configuration of a vehicle control system using the environment estimation apparatus of an embodiment 3 in accordance with the present invention. In FIG. 8, the vehicle control system 1B of the embodiment 3, which is a control system for controlling the operation of the onboard equipment, comprises an environment estimation apparatus 2b and the vehicle signal control unit 6. In addition, the environment estimation apparatus 2b, which is a device for estimating the surrounding environment of the vehicle from a camera image taken with the vehicle camera, comprises the image area dividing unit 3, a camera image information extracting unit 4b and an environment estimation unit 5b. Incidentally, in FIG. 8, the same components as those of FIG. 1 are designated by the same reference numerals and their description will be omitted.

The camera image information extracting unit 4b, which is a component for extracting the camera image information from an image area obtained by dividing into a plurality of image areas by the image area dividing unit 3, comprises a plural area luminance information extracting unit 43. The plural area luminance information extracting unit 43 is a component for dividing the plurality of image areas obtained by the image area dividing unit 3 into three image areas of the upper, central, and lower blocks, and for extracting the mean illuminances E1, E2 and E3, which are obtained by averaging the illuminances of the pixels in the individual image areas undergoing the division into the upper, central, and lower blocks, as the luminance information.

Incidentally, the three image areas, which undergo the division into the upper, central, and lower blocks, correspond to the upper rectangular area (Y=1), central rectangular area (Y=2), and lower rectangular area (Y=3) of FIG. 2 shown in the foregoing embodiment 1. In the following description, it is assumed that the plural area luminance information extracting unit 43 calculates the mean illuminances E1, E2 and E3 from the upper rectangular area (Y=1), central rectangular area (Y=2), and lower rectangular area (Y=3).

The environment estimation unit 5b is a component for estimating the surrounding environment of the vehicle from the camera image information extracted by the camera image information extracting unit 4b. In the embodiment 3, the environment estimation unit 5b estimates the surrounding environment at the spot of the vehicle from the comparison results of the individual mean illuminances E1, E2 and E3 of the image areas undergoing the division into the upper, central, and lower blocks, which are extracted by the plural area luminance information extracting unit 43, with prescribed thresholds concerning them.

FIG. 9 is a table showing an example of the correspondence between the relationships of the mean illuminances of the individual rectangular image areas with the surrounding environment and the contents of the vehicle signal in the embodiment 3. In FIG. 9, the data indicating the correspondence of the relationships between the values the mean illuminances E1, E2 and E3 of the upper rectangular area (Y=1), central rectangular area (Y=2) and lower rectangular area (Y=3) can take to the contents of the environment estimates is set in the environment estimation unit 5b. In addition, the data indicating the correspondence of the contents of the environment estimates shown in FIG. 9 to the contents of the vehicle signal is set in the vehicle signal control unit 6.

For example, when the environment estimates indicate daytime without rain (daytime and fair and clear, daytime and clear, daytime and cloudy), the vehicle signal ILL for instructing to turn on the vehicle lights is made off, the vehicle signal for instructing to drive the wipers is made off, and the vehicle signal for instructing to turn on the fog light is made off.

When the environment estimates indicate daytime but foggy, among the vehicle lights, the vehicle signal ILL for instructing to turn on the sidelights is made on, the vehicle signal for instructing to drive the wipers is made off, and the vehicle signal for instructing to turn on the fog light is made on.

When the environment estimates indicate nighttime without rain, the vehicle signal ILL for instructing to turn on the vehicle lights (headlights) is made on, the vehicle signal for instructing to drive the wipers is made off, and the vehicle signal for instructing to turn on the fog light is made off. In addition to that, when the environment estimates indicate nighttime and rainy, the vehicle signal for instructing to drive the wipers is made on.

When the environment estimates indicate daytime and rainy, among the vehicle lights, the vehicle signal ILL for instructing to turn on the sidelights is made on, the vehicle signal for instructing to drive the wipers is made on, and the vehicle signal for instructing to turn on the fog light is made off.

Next, the operation will be described.

Figure 10:
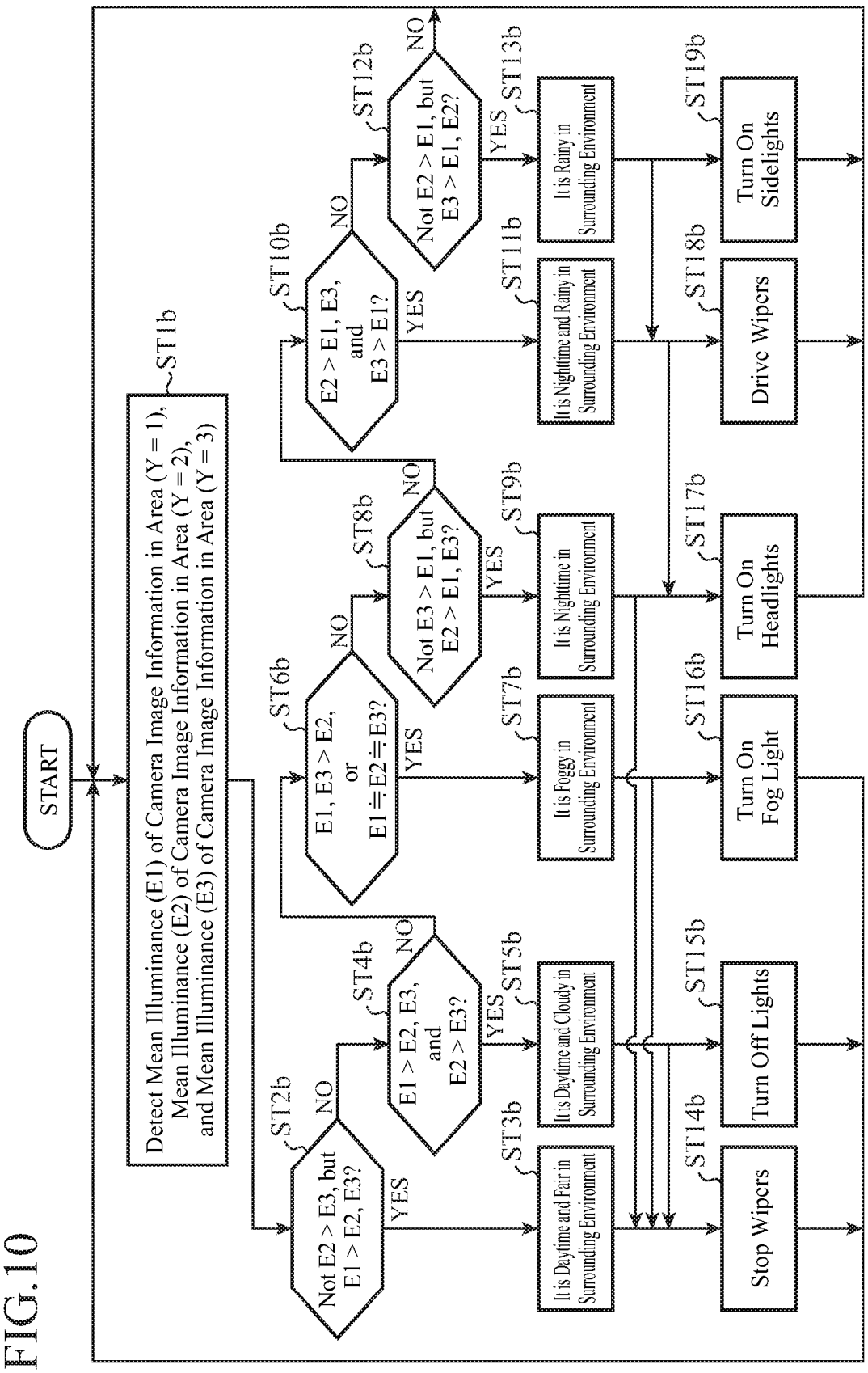
FIG. 10 is a flowchart showing a flow of the environment estimation and vehicle control of the embodiment 3.

FIG. 10 is a flowchart showing a flow of the environment estimation and the vehicle control of the embodiment 3. Referring to FIG. 10, the environment estimation processing and the vehicle control processing will be described in detail. Incidentally, as for the system configuration, we will refer to FIG. 8.

First, the plural area luminance information extracting unit 43 of the camera image information extracting unit 4b detects the mean illuminance E1 of the upper rectangular area (Y=1), the mean illuminance E2 of the central rectangular area (Y=2), and the mean illuminance E3 of the lower rectangular area (Y=3) from the upper rectangular area (Y=1), central rectangular area (Y=2) and lower rectangular area (Y=3) among the plurality of image areas obtained by the image area dividing unit 3 (step ST1b).

Next, receiving the mean illuminance E1 of the upper rectangular area (Y=1), the mean illuminance E2 of the central rectangular area (Y=2), and the mean illuminance E3 of the lower rectangular area (Y=3) from the plural area luminance information extracting unit 43, the environment estimation unit 5b decides as to whether the illuminance relationships that the mean illuminance E2 is not greater than the mean illuminance E3 and that the mean illuminance E1 is greater than the mean illuminances E2 and E3 (that is, not E2>E3, and E1>E2 and E3) hold true or not (step ST2b).

If the illuminance relationships hold true (YES at step ST2b), the environment estimation unit 5b estimates that it is daytime and fair in the surrounding environment of the vehicle by referring to the preset data indicating the correspondence between the relationships of the mean illuminances and the environment estimates in accordance with the decision result, and supplies the estimation result to the vehicle signal control unit 6 (step ST3b).

On the other hand, unless the illuminance relationships hold true (NO at step ST2b), the environment estimation unit 5b decides as to whether the illuminance relationships that the mean illuminance E1 is greater than the mean illuminances E2 and E3 and that the mean illuminance E2 is greater than the mean illuminance E3 (E1>E2 and E3, and E2>E3) hold true or not (step ST4b).

Here, if the illuminance relationships of E1>E2 and E3, and E2>E3 hold true (YES at step ST4b), the environment estimation unit 5b estimates that it is daytime and cloudy in the surrounding environment of the vehicle by referring to the preset data indicating the correspondence between the relationships of the mean illuminances and the environment estimates in accordance with the decision result, and supplies the estimation result to the vehicle signal control unit 6 (step ST5b).

In addition, unless the illuminance relationships of E1>E2 and E3 and E2>E3 hold true (NO at step ST4b), the environment estimation unit 5b decides as to whether the illuminance relationships that the mean illuminances E1 and E3 are both greater than the mean illuminance E2 or that the mean illuminances E1, E2 and E3 are nearly equal (E1 and E3>E2, or E1≈E2≈E3) hold true or not (step ST6b).

If the illuminance relationships hold true (YES at step ST6b), the environment estimation unit 5b estimates that it is foggy in the surrounding environment of the vehicle by referring to the preset data indicating the correspondence between the relationships of the mean illuminances and the environment estimates in accordance with the decision result, and supplies the estimation result to the vehicle signal control unit 6 (step ST7b).

On the other hand, unless the illuminance relationships hold true (NO at step ST6b), the environment estimation unit 5b decides as to whether the illuminance relationships that the mean illuminance E3 is not greater than the mean illuminance E1 and that the mean illuminance E2 is greater than both the mean illuminances E1 and E3 (not E3>E1, and E2>E1 and E3) hold true or not (step ST8b).

Here, if the illuminance relationships of not E3>E1 and E2>E1 and E3 (YES at step ST8b), the environment estimation unit 5b estimates that it is nighttime in the surrounding environment of the vehicle by referring to the preset data indicating the correspondence between the relationships of the mean illuminances and the environment estimates in accordance with the decision result, and supplies the estimation result to the vehicle signal control unit 6 (step ST9b).

Unless the illuminance relationships of not E3>E1 and E2>E1 and E3 hold true (NO at step ST8b), the environment estimation unit 5b decides as to whether the illuminance relationships that the mean illuminance E2 is greater than the mean illuminances E1 and E3 and that the mean illuminance E3 is greater than the mean illuminance E1 (E2>E1 and E3, and E3>E1) hold true or not (step ST10b).

If the illuminance relationships hold true (YES at step ST10b), the environment estimation unit 5b estimates that it is nighttime and rainy in the surrounding environment of the vehicle by referring to the preset data indicating the correspondence between the relationships of the mean illuminances and the environment estimates in accordance with the decision result, and supplies the estimation result to the vehicle signal control unit 6 (step ST11b).

On the other hand, unless the illuminance relationships hold true (NO at step ST10b), the environment estimation unit 5b decides as to whether the illuminance relationships that the mean illuminance E2 is not greater than the mean illuminance E1 and that the mean illuminance E3 is greater than both the mean illuminances E1 and E2 (not E2>E1, and E3>E1 and E2) hold true or not (step ST12b).

Here, if the illuminance relationships of not E2>E1 and E3>E1 and E2 (YES at step ST12b), the environment estimation unit 5b estimates that it is rainy in the surrounding environment of the vehicle by referring to the preset data indicating the correspondence between the relationships of the mean illuminances with the environment estimates in accordance with the decision result, and supplies the estimation result to the vehicle signal control unit 6 (step ST13b).

Unless the illuminance relationships of not E2>E1 and E3>E1 and E2 hold true (NO at step ST12b), the processing returns to step ST1b to repeat the foregoing processing to monitor the change of the surrounding environment of the vehicle and controls the onboard equipment in accordance with the change.

Receiving the estimation result that it is daytime and fair in the surrounding environment of the vehicle (step ST3b), or that it is daytime and cloudy in the surrounding environment of the vehicle (step ST5b), or that it is foggy in the surrounding environment of the vehicle (step ST7b), or that it is nighttime in the surrounding environment of the vehicle (step ST9b), the vehicle signal control unit 6 supplies the vehicle ECU with the vehicle signal for stopping the wipers by referring to the preset data indicating the correspondence between the content of the environment estimates and the content of the vehicle signal the in accordance with the estimation result. The vehicle ECU stops the wipers in response to the vehicle signal from the vehicle signal control unit 6 (step ST14b).

In addition, receiving the estimation result that it is daytime and cloudy in the surrounding environment of the vehicle (step ST5b), the vehicle signal control unit 6 supplies the vehicle ECU with the vehicle signal for turning off the vehicle lights by referring to the preset data indicating the correspondence between the content of the environment estimates and the content of the vehicle signal in accordance with the estimation result. The vehicle ECU turns off the vehicle lights in response to the vehicle signal from the vehicle signal control unit 6 (step ST15b).

Furthermore, receiving the estimation result that it is foggy in the surrounding environment of the vehicle (step ST7b), the vehicle signal control unit 6 supplies the vehicle ECU with the vehicle signal for turning on the fog light by referring to the preset data indicating the correspondence between the content of the environment estimates and the content of the vehicle signal in accordance with the estimation result. The vehicle ECU turns on the fog light in response to the vehicle signal from the vehicle signal control unit 6 (step ST16b).

In addition, receiving the estimation result that it is nighttime in the surrounding environment of the vehicle (step ST9b) or that it is nighttime and rainy in the surrounding environment of the vehicle (step ST11b), the vehicle signal control unit 6 supplies the vehicle ECU with the vehicle signal for turning on the vehicle lights by referring to the preset data indicating the correspondence between the content of the environment estimates and the content of the vehicle signal in accordance with the estimation result. The vehicle ECU turns on the headlights among the vehicle lights in response to the vehicle signal from the vehicle signal control unit 6 (step ST17b).

Receiving the estimation result that it is nighttime and rainy in the surrounding environment of the vehicle (step ST11b) or it is rainy (step ST13b), the vehicle signal control unit 6 supplies the vehicle ECU with the vehicle signal for driving the wipers by referring to the preset data indicating the correspondence between the content of the environment estimates and the content of the vehicle signal in accordance with the estimation result. The vehicle ECU drives the wipers in response to the vehicle signal from the vehicle signal control unit 6 (step ST18b).

In addition, receiving the estimation result that it is rainy in the surrounding environment of the vehicle (step ST13b), the vehicle signal control unit 6 supplies the vehicle ECU with the vehicle signal for turning on the sidelights by referring to the preset data indicating the correspondence between the content of the environment estimates and the content of the vehicle signal in accordance with the estimation result. The vehicle ECU turns on the sidelights in response to the vehicle signal from the vehicle signal control unit 6 (step ST19b).

When the processing at step ST14b, step ST15b, step ST16b, step ST17b, step ST18b or step ST19b has been completed, it returns to step ST1b so that the environment estimation unit 5b repeats the foregoing processing to monitor the change of the surrounding environment of the vehicle, thereby executing the control of the onboard equipment in accordance with the change.

As described above, according to the present embodiment 3, the camera image information extracting unit 4b extracts, from among the plurality of image areas undergoing the division by the image area dividing unit 3, the luminance information about the upper image area (Y=1) including the image area that has at least the sky taken and about the lower image area (Y 3) including the image of the ground taken; and the environment estimation unit 5b estimates the weather and the intensity of light of the surrounding environment by referring to the corresponding data indicating the correspondence of the luminance information about the image area to the weather and the intensity of light of the surrounding environment in accordance with the luminance information items extracted by the camera image information extracting unit 4b.

Thus, since it can estimate the surrounding environment of the vehicle by dividing the camera image taken with the vehicle camera fixedly installed in the vehicle into the three image areas of the upper rectangular area (Y=1), central rectangular area (Y=2) and lower rectangular area (Y=3) and by using the relationships between the mean illuminances E1 and E2 and E3 of the image areas, it can eliminate the necessity for a dedicated sensor or an image recognition chip, and estimate the surrounding environment of the vehicle by the simple configuration.

Embodiment 4

The embodiment 4 estimates the surrounding environment of the vehicle depending on whether the shape of a marker on a camera image taken with the vehicle camera alters or not. More specifically, when an image of a subject on the plane of projection of the vehicle camera alters, it decides that reflection or refraction of light occurs owing to raindrops or rain film on the camera lens of the vehicle camera, and estimates that it is rainy in the surroundings of the vehicle.

FIG. 11 is a diagram illustrating alteration of a subject on the plane of projection due to raindrops. As shown in FIG. 11(a), unless the camera lens 7 has raindrops or rain film on its surface, a subject S0 makes an image S1 on the plane of projection of the vehicle camera because of refraction of light through the camera lens 7. The embodiment 4 provides a marker with a specific shape on a part of the body of the vehicle within the imaging range of the vehicle camera, and prepares subject shape data indicating the shape of the marker in advance.

When it becomes rainy in the surroundings of the vehicle and a foreign body 8 for refracting light such as raindrops or rain film attaches onto the camera lens 7 as shown in FIG. 11(b), refraction occurs not only through the camera lens 7, but also through the foreign body 8. Accordingly, the subject S0 makes an image S2 different from that of FIG. 11(a) on the plane of projection in the vehicle camera. In this case, the shape of the subject S0 alters on the camera image.

Accordingly, if the marker in the camera image changes from the shape defined by the subject shape data prepared in advance, it can be decided that the surroundings of the vehicle have rainy weather.

Figure 12:
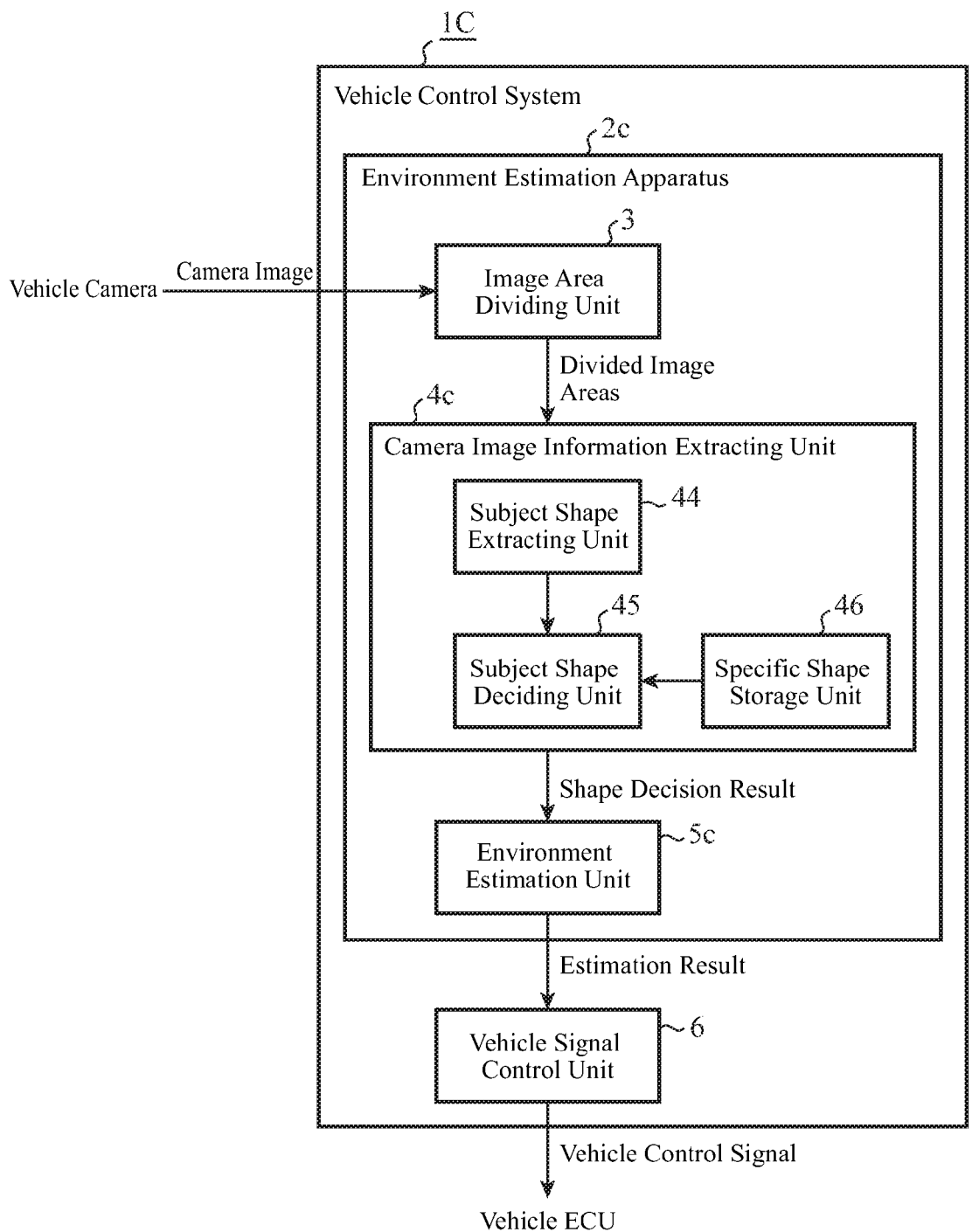
FIG. 12 is a block diagram showing a configuration of a vehicle control system using an environment estimation apparatus of an embodiment 4 in accordance with the present invention.

FIG. 12 is a block diagram showing a configuration of the vehicle control system using the environment estimation apparatus of the embodiment 4 in accordance with the present invention, in which the same components as those of FIG. 1 are designated by the same reference numerals and their description will be omitted. In FIG. 12, the vehicle control system 1C of the embodiment 4, which is a control system for controlling the operation of the onboard equipment, comprises an environment estimation apparatus 2c and a vehicle signal control unit 6.

The environment estimation apparatus 2c, which is a device for estimating the surrounding environment of the vehicle from the camera image taken with the vehicle camera, comprises the image area dividing unit 3, a camera image information extracting unit 4c and an environment estimation unit 5c. Incidentally, in present embodiment 4, the vehicle camera is fixed in such a manner that a part of the body of the vehicle is included in the imaging range, and a marker with a specific shape is mounted on the part of the body.

The camera image information extracting unit 4c, which is a component for extracting camera image information from image areas undergoing the division by the image area dividing unit 3, comprises a subject shape extracting unit 44, a subject shape deciding unit 45 and a specific shape storage unit 46.

The subject shape extracting unit 44 is a component for identifying an image area which includes an image of the part of the body having the marker with the specific shape from a plurality of image areas provided by the image area dividing unit 3, and for extracting the shape of the marker in the image area.

The subject shape deciding unit 45 is a component for deciding on whether the shape of the marker in the image area extracted by the subject shape extracting unit 44 matches the shape designated by the specific shape data stored in the specific shape storage unit 46 or not, and supplies the shape decision result to the environment estimation unit 5c as the camera image information.

The specific shape storage unit 46 is a storage unit for storing the specific shape data designating the shape of the marker in the camera image in a state without any foreign body such as raindrops that will bring about refraction of light on the camera lens of the vehicle camera.

The environment estimation unit 5c is a component for estimating the surrounding environment of the vehicle from the camera image information supplied from the camera image information extracting unit 4c. In the embodiment 4, the environment estimation unit 5c estimates the surrounding environment at the spot of the vehicle from the shape decision result by the subject shape deciding unit 45.

More specifically, if the shape of the marker in the image area does not agree with the shape designated by the specific shape data, it estimates that the camera lens 7 of the vehicle camera has the foreign body 8 such as raindrops or rain film attached thereto, and that the weather in the surroundings of the vehicle is rainy or like that will cause the foreign body 8 to be attached.

In contrast, when the shape of the marker in the image area agrees with the shape designated by the specific shape data, it estimates that it is not rainy in the surroundings of the vehicle, and the weather is one that will not cause the foreign body 8 to be attached to the camera lens 7.

Figure 13:
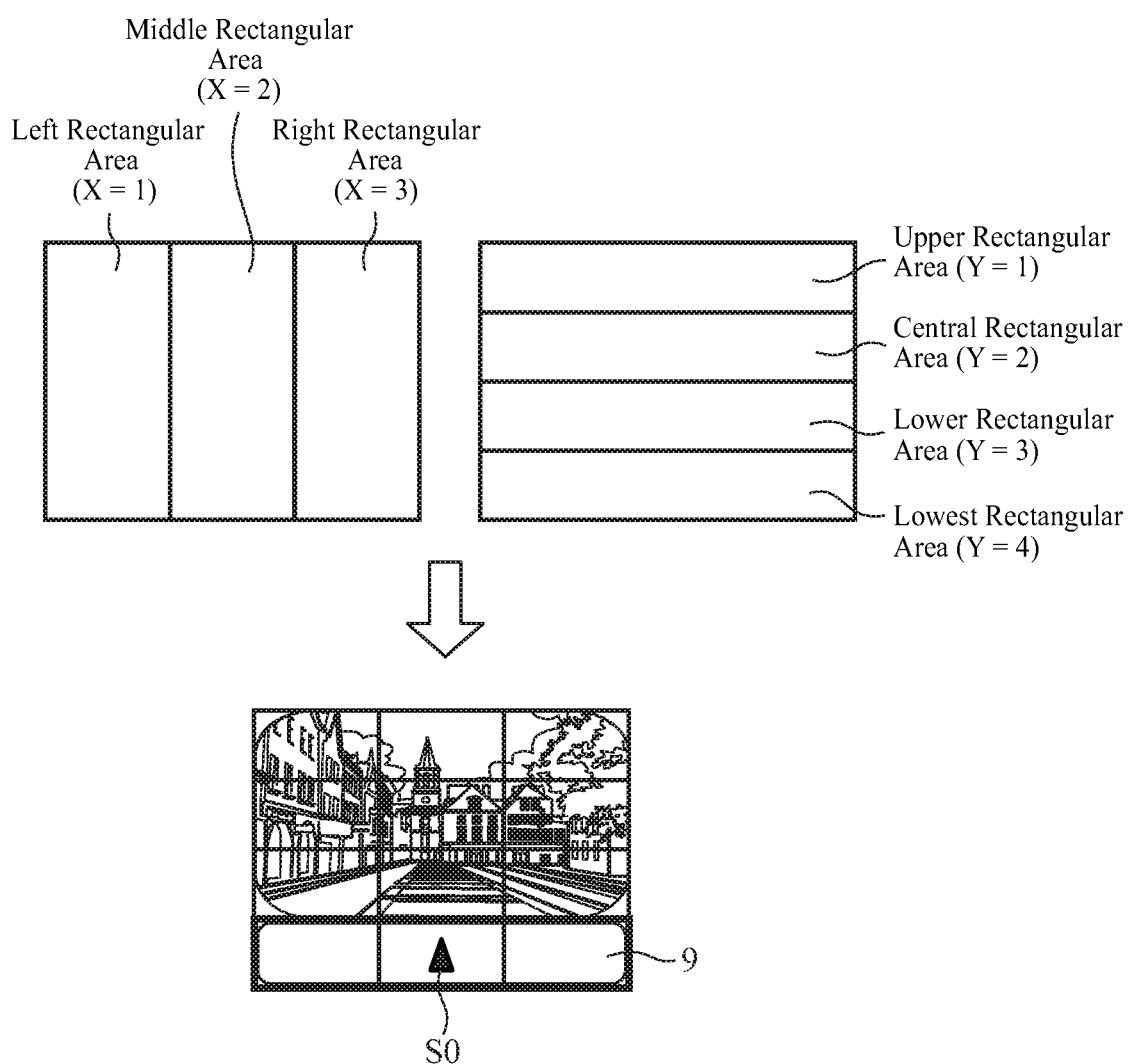
FIG. 13 is a diagram showing an example of dividing processing of a camera image in the embodiment 4.

FIG. 13 is a diagram showing an example of the dividing processing of a camera image of the embodiment 4. The camera image shown in FIG. 13 is an image taken with a rear camera which has the horizontal angle of view of 180 degrees and the vertical angle of view of 150 degrees, and is fixed on the midline of the vehicle at the setting height of 500 mm, the horizontal setting angle of 0 degree and the vertical setting angle of 45 degrees so that the rear direction of the vehicle comes into the imaging range. In the example of FIG. 13, the image area dividing unit 3 assigns the X axis to the horizontal direction (right and left direction) of the screen showing the camera image and the Y axis to the vertical direction (up and down direction) thereof, and divides the screen into three sections with prescribed sizes in the X axis direction and into four sections with prescribed sizes in the Y axis direction, thereby defining image areas (XY=11-34). More specifically, it divides the X axis direction of the camera image into three parts of the left rectangular area (X=1), middle rectangular area (X=2), and right rectangular area (X=3), and divides the Y axis direction into four parts of the upper rectangular area (Y=1), central rectangular area (Y=2), lower rectangular area (Y=3), and the lowest rectangular area (Y=4), thereby dividing into 12 image areas as a whole.

Here, FIG. 13 shows a camera image when the vehicle is moving in a city. The subject of the vehicle camera contains "ground objects" such as urban buildings and structures and trees, "the sky" that is a natural view, "the ground" indicating the driving road, and the "body" which is the part of the body 9 having the marker S0 with the specific shape attached thereon. Incidentally, as the part of the body 9, a bumper or license plate is applicable, for example.

The main subjects in each image area are as follows: the area (XY=11) has "ground objects and the sky" since part of the buildings and the sky appear mainly therein, the area (XY=21) has "the sky" and the area (XY=31) has "ground objects and the sky" since trees and the sky appear mainly therein; the area (XY=12) has "ground objects", the area (XY=22) has "ground objects" as well, and the area (XY=32) has "ground objects"; the area (XY=13) has "ground objects and the ground", the area (XY=23) has "the ground", and the area (XY=33) has "ground objects and the ground"; and the area (XY=14), area (XY=24), and area (XY=34) have the "body".

In addition, subjects of the vehicle camera during the travel of the vehicle through a mountainous region include a "mountain" and "the sky" which are a natural view, "the ground" indicating the driving road, and the "body" which is the part of the body 9.

For example, when the vehicle travels along a mountain path and a mountain is seen remotely in the direction of traveling of the vehicle, the main subjects in each image area are as follows: the area (XY=11) has the "mountain and the sky", the area (XY=21) has "the sky", and the area (XY=31) has the "mountain and the sky"; the area (XY=12) has the "mountain", the area (XY=22) has the "mountain and the sky", and the area (XY=32) has the "mountain and the sky" as well; the area (XY=13) has "the ground", the area (XY=23) has "the ground", and the area (XY=33) has "the ground"; and the area (XY=14), area (XY=24), and area (XY=34) have the "body".

Furthermore, a subject of the vehicle camera when the vehicle travels in a plain other than cities (such as a grassy plain without any building) contains a "plain" such as a grassy plain and "the sky" which are a natural view, and "the ground" indicating the driving road. For example, when the vehicle travels along a road passing through a plain, the main subjects in each image area are as follows: the area (XY=11) has "the sky", the area (XY=21) has "the sky", and the area (XY=31) has "the sky"; the area (XY=12) has the "plain", the area (XY=22) has "the plain and the sky", and the area (XY=32) has the "plain"; the area (XY=13) has "the ground", the area (XY=23) has "the ground", and the area (XY=33) has "the ground"; and the area (XY=14), area (XY=24), and area (XY=34) have the "body".

Thus, by fixing the vehicle camera in such a manner that its field of view includes the part of the body 9 which has the marker with the specific shape S0 provided thereon and by repeating to take an image continuously or periodically while the vehicle is traveling outside, at least part of the body 9 is included as a subject. For example, in FIG. 13, the lowest rectangular area (Y=4) includes the part of the body 9 as a subject.

Thus, the present embodiment 4 defines the image areas (XY=14, 24, and 34) in the lowest rectangular area (Y=4) as an image area that includes the part of the body 9. In addition, it defines the image area (XY=24) as the image area that includes the marker with the specific shape S0 as a subject.

Next, the operation will be described.

Figure 14:
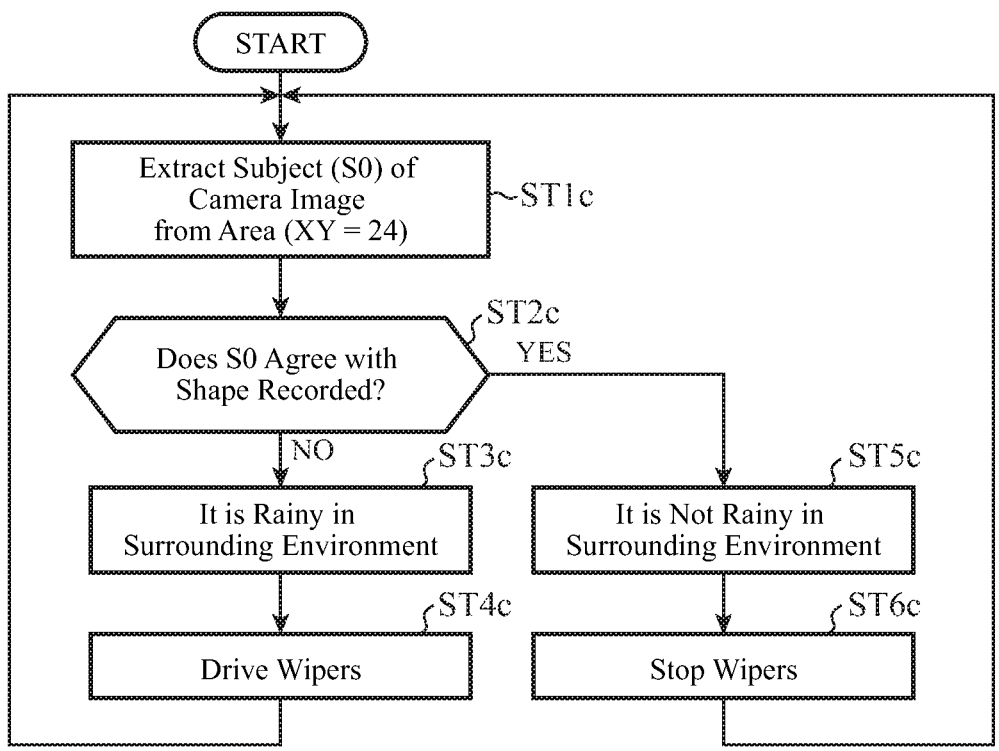
FIG. 14 is a flowchart showing a flow of the environment estimation and vehicle control of the embodiment 4.

FIG. 14 is a flowchart showing a flow of the environment estimation and vehicle control of the embodiment 4. Referring to FIG. 14, the environment estimation processing and the vehicle control processing will be described in detail. Incidentally, as for the system configuration, we will refer to FIG. 12.

First, the subject shape extracting unit 44 of the camera image information extracting unit 4c identifies a rectangular image area that includes the part of the body 9 as a subject from the plurality of image areas obtained by the image area dividing unit 3, and extracts an image area that includes the marker S0 as a subject from the rectangular image area (step ST1c). Here, it identifies in the camera image of the vehicle camera the image area corresponding to the lowest rectangular area (Y=4) of FIG. 13 as the rectangular image area that includes the part of the body 9 as a subject, and extracts the image area (XY=24) in the lowest rectangular area (Y=4) as the image area that includes the marker S0 as a subject.

Next, the subject shape deciding unit 45 executes the shape recognition processing of the image area (XY=24), which includes the marker S0 extracted by the subject shape extracting unit 44 as a subject, by using the specific shape data read out of the specific shape storage unit 46, thereby making a decision on whether the shape of the marker S0 in the image area (XY=24) matches the shape designated by the specific shape data or not (step ST2c). The shape decision result is supplied from the subject shape deciding unit 45 to the environment estimation unit 5c.

Receiving the shape decision result that the shape of the marker S0 does not agree with the shape of the specific shape data from the subject shape deciding unit 45 (NO at step ST2c), the environment estimation unit 5c estimates that it is rainy in the surrounding environment of the vehicle, and supplies the estimation result to the vehicle signal control unit 6 (step ST3c).

Receiving the estimation result that it is rainy in the surrounding environment of the vehicle, the vehicle signal control unit 6 supplies, unless the wipers have been driven previously, the vehicle ECU with the vehicle signal for driving the wipers in accordance with the estimation result. Thus, the vehicle ECU drives the wipers in response to the vehicle signal from the vehicle signal control unit 6 (step ST4c).

On the other hand, receiving the shape decision result that the shape of the marker S0 agrees with the shape of the specific shape data (YES at step ST2c), the environment estimation unit 5c estimates that it is other than a rainy weather in the surrounding environment of the vehicle, and supplies the estimation result to the vehicle signal control unit 6 (step ST5c).

Receiving the estimation result, the vehicle signal control unit 6 supplies, if the wipers have been driven previously, the vehicle ECU with the vehicle signal for stopping the wipers. The vehicle ECU stops the wipers in response to the vehicle signal from the vehicle signal control unit 6 (step ST6c).

When the processing at step ST4c or step ST6c is completed, the processing returns to step ST1c, again, repeats the foregoing processing to monitor the change in the weather, and controls the onboard equipment in accordance with the change.

As described above, according to the present embodiment 4, it comprises the image area dividing unit 3 for dividing the camera image taken with the vehicle camera into a plurality of image areas; the camera image information extracting unit 4c for extracting the image area that includes the marker S0 with the specific shape from the plurality of image areas undergoing the division by the image area dividing unit 3; and the environment estimation unit 5c for estimating the weather of the surrounding environment depending on whether the shape of the marker S0 in the image area that has the marker S0 taken, which is extracted by the camera image information extracting unit 4c, agrees with the specific shape data that designates the shape of the marker S0 and is prepared in advance. Thus, it identifies, from the camera image of the vehicle camera fixed on the vehicle, the image area including the marker with the specific shape S0 as a subject, and estimates the surrounding environment of the vehicle depending on whether the shape of the marker S0 in the image area agrees with the shape designated by the specific shape data prepared in advance. Accordingly, it can obviate the necessity of a dedicated sensor or an image recognition chip, and can estimate the surrounding environment of the vehicle by the simple configuration.

Although the foregoing embodiments 1-4 show examples which apply the environment estimation apparatus in accordance with the present invention to the vehicle control system for controlling the onboard equipment, it is also applicable to a system as long as the system can acquire a camera image including the sky or the like as a subject, which enables specifying the change of the surrounding environment. For example, in a monitoring camera system that watches outdoors, if a camera is fixed in such a manner that a subject includes the sky, the system can estimate the surrounding environment to be observed only from the camera image.

Incidentally, it is to be understood that a free combination of the individual embodiments, variations of any components of the individual embodiments or removal of any components of the individual embodiments are possible within the scope of the present invention.

INDUSTRIAL APPLICABILITY

An environment estimation apparatus in accordance with the present invention can estimate from a camera image the surrounding environment of a subject taken with a simple configuration. Accordingly, it is suitable for a vehicle control system for controlling the operation of the onboard equipment of a vehicle installing a vehicle camera.

DESCRIPTION OF REFERENCE NUMERALS

1, 1A, 1B, 1C vehicle control system; 2, 2a, 2b, 2c environment estimation apparatus; 3 image area dividing unit; 4, 4a, 4b, 4c camera image information extracting unit (information extracting unit); 5, 5a, 5b, 5c environment estimation unit; 6 vehicle signal control unit; 7 camera lens; 8 foreign body; 9 part of vehicle; 41 single area luminance information extracting unit; 42 single area color information extracting unit; 43 plural area luminance information extracting unit; 44 subject shape extracting unit; 45 subject shape deciding unit; 46 specific shape storage unit.

What is claimed is:

1. An environment estimation apparatus comprising:
an image area dividing unit for dividing a shot image taken with an imaging unit into a plurality of image areas;
an information extracting unit for extracting, from the plurality of image areas undergoing the division by the image area dividing unit, an image area that has a marker with a specific shape taken, said marker being intentionally provided on a predesignated location of a body of a vehicle, with said specific shape, for making a shape decision; and
an environment estimation unit for estimating weather of a surrounding environment depending on whether or not the shape of the marker in the image area that has the marker taken and is extracted by the information extracting unit agrees with shape data that designates the shape of the marker and is stored in advance, which marker is taken with the imaging unit.

2. A vehicle control system comprising:
an environment estimation apparatus as defined in claim 1; and
a vehicle signal control unit for generating a vehicle signal for controlling driving of onboard equipment in accordance with an estimation result of the environment estimation apparatus.

* * * * *